US012687498B1

(12) United States Patent
      Clegg et al.

(10) Patent No.: US 12,687,498 B1
(45) Date of Patent: Jul. 21, 2026

(54) PORTABLE SPECTROSCOPIC ANALYSIS ASSEMBLY

(71) Applicant: Triad National Security, LLC, Los Alamos, NM (US)

(72) Inventors: Samuel M. Clegg, Los Alamos, NM (US); Ronald K. Martinez, Santa Cruz, NM (US); Kristy L. Nowak-Lovato, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 133 days.

(21) Appl. No.: 18/670,559

(22) Filed: May 21, 2024

Related U.S. Application Data

(60) Provisional application No. 63/503,689, filed on May 22, 2023.

(51) Int. Cl.
    *G01N 21/65* (2006.01)
    *G01N 21/71* (2006.01)

(52) U.S. Cl.
    CPC .......... *G01N 21/65* (2013.01); *G01N 21/718* (2013.01); *G01N 2201/0221* (2013.01); *G01N 2201/06113* (2013.01)

(58) Field of Classification Search
    CPC ................. G01N 21/65; G01N 21/718; G01N 2201/0221; G01N 2201/06113
    See application file for complete search history.

(56) References Cited

U.S. PATENT DOCUMENTS

| 6,069,689 | A | * | 5/2000 | Zeng | .................... | A61B 5/0071 |
| | | | | | | 356/73 |
| 2008/0151241 | A1 | * | 6/2008 | Lindfors | .............. | G01N 21/718 |
| | | | | | | 356/318 |
| 2012/0062874 | A1 | * | 3/2012 | Beckstead | ................. | G01J 3/44 |
| | | | | | | 356/73 |
| 2020/0324282 | A1 | * | 10/2020 | Postier | ................. | G01N 21/253 |
| 2020/0340859 | A1 | * | 10/2020 | Meng | .................... | G01J 3/1838 |

(Continued)

OTHER PUBLICATIONS

Wiens et al., The SuperCam Instrument Suite on the NASA Mar. 2020 Rover: Body Unit and Combined System Tests, Space Sci Rev 217, 4 (Dec. 2020), 87 pages.

(Continued)

*Primary Examiner* — Tarifur R Chowdhury
*Assistant Examiner* — Akbar H. Rizvi
(74) *Attorney, Agent, or Firm* — Klarquist Sparkman, LLP

(57) ABSTRACT

Portable spectroscopic analysis assemblies are disclosed. In an example, an apparatus comprises an analysis subassembly, a probe subassembly, a tether subassembly interconnecting the analysis subassembly and the probe subassembly, and a laser source. The analysis subassembly comprises a spectroscopy subassembly. The laser source is configured to generate an excitation laser signal. The probe subassembly is configured to transmit the excitation laser signal to a sample and to receive an optical response signal from the sample, and the tether subassembly is configured to convey the optical response signal to the spectroscopy subassembly. The apparatus is operative to perform each of a laser-induced breakdown spectroscopy (LIBS) analysis and a Raman spectroscopy analysis of the optical response signal to at least partially characterize a composition of the sample.

21 Claims, 3 Drawing Sheets

(56) References Cited

U.S. PATENT DOCUMENTS

2022/0221338 A1 *    7/2022  Rodriguez-Saona  .....  G01J 3/44
2022/0381681 A1 *  12/2022  Poteet  ...................  G01N 21/31

OTHER PUBLICATIONS

Wiens et al., The SuperCam Instrument Suite on the Mars 2020 Rover: Science Objectives and Mast-Unit Description, Space Sci Rev 217, 47 (Apr. 2021), 108 pages.

* cited by examiner

PORTABLE SPECTROSCOPIC ANALYSIS ASSEMBLY

CROSS REFERENCE TO RELATED APPLICATION

This application claims the benefit of U.S. Provisional Patent Application No. 63/503,689, filed May 22, 2023, the entirety of which is incorporated by reference herein.

ACKNOWLEDGMENT OF GOVERNMENT SUPPORT

This material is based upon work supported under Contract No. 89233218CNA000001 awarded by the U.S. Department of Energy/National Nuclear Security Administration. The government has certain rights in the invention.

FIELD

The present disclosure is directed to spectroscopic analysis assemblies, and more particularly to portable spectroscopic analysis assemblies that are configured to perform a plurality of distinct spectroscopic analyses on a sample.

BACKGROUND

The identification of the chemical and mineralogical composition of materials such as rock and/or coal-related samples, can have a variety of uses. For example, various spectroscopic analyses can be performed on a sample of unknown composition to identify the presence and/or abundance of commercially valuable elements and minerals therein. While a variety of spectroscopic tools exist, such tools typically are laboratory-based or are limited to a single analysis technique.

Accordingly, there exists a need for a portable spectroscopic analysis assembly that employs multiple complementary spectroscopic analyses.

SUMMARY

Disclosed herein are examples of portable spectroscopic analysis assemblies.

In a representative example, an apparatus comprises an analysis subassembly, a probe subassembly, a tether subassembly interconnecting the analysis subassembly and the probe subassembly, and a laser source. The analysis subassembly comprises a spectroscopy subassembly. The laser source is configured to generate an excitation laser signal. The probe subassembly is configured to transmit the excitation laser signal to a sample and to receive an optical response signal from the sample, and the tether subassembly is configured to convey the optical response signal to the spectroscopy subassembly. The apparatus is operative to perform each of a laser-induced breakdown spectroscopy (LIBS) analysis and a Raman spectroscopy analysis of the optical response signal to at least partially characterize a composition of the sample.

The foregoing and other objects, features, and advantages of the disclosed technology will become more apparent from the following detailed description, which proceeds with reference to the accompanying figures.

DETAILED DESCRIPTION

General Considerations

Figure 1:
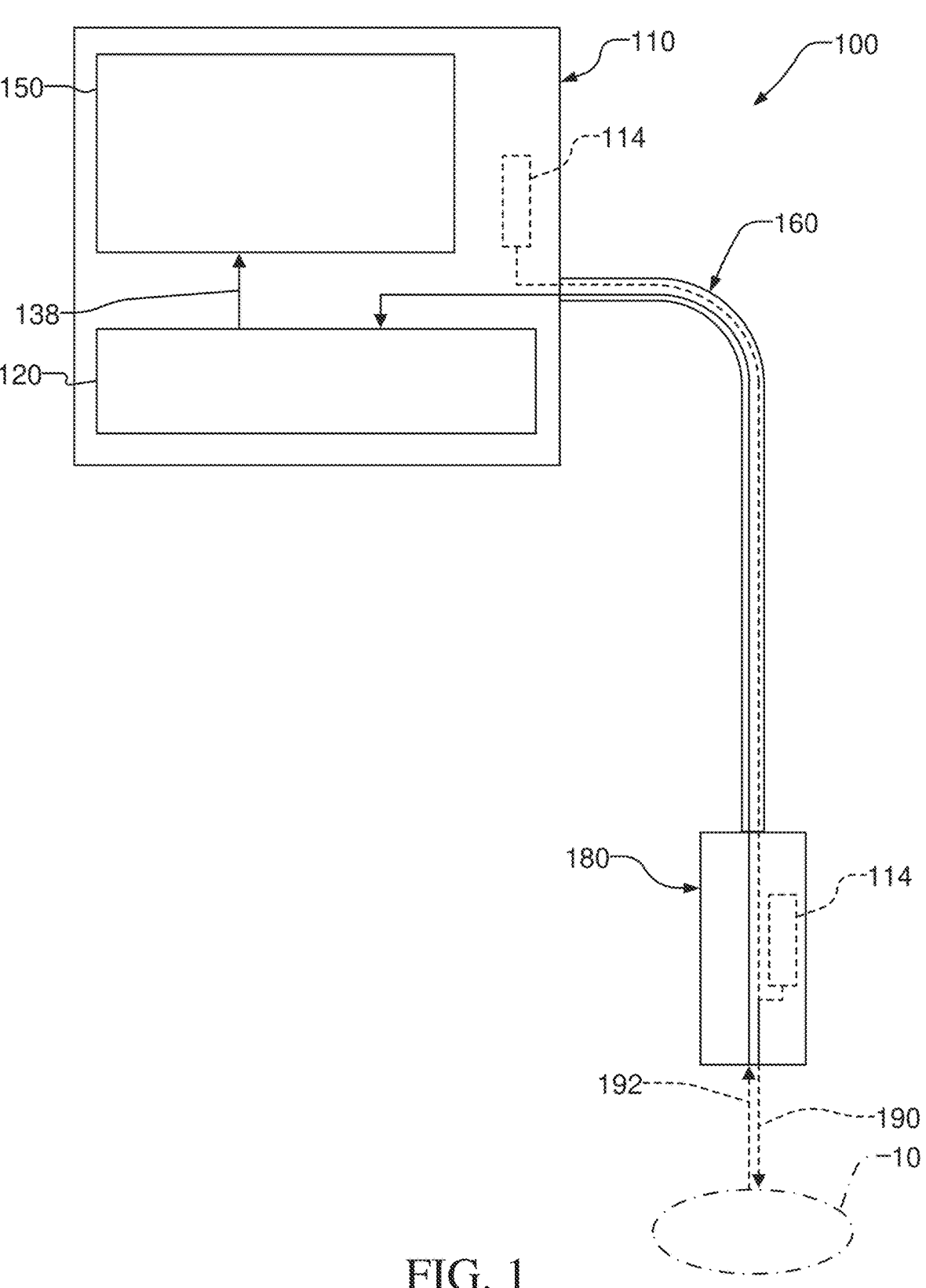
FIG. 1 is a schematic representation of a spectroscopic analysis assembly according to an example.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function, but rather that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function additionally (or alternatively) may be described as being configured to perform that function, and vice versa. Similarly, subject matter that is recited as being configured to perform a particular function additionally (or alternatively) may be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); and in yet another example, to both A and B (optionally including other entities). These entities may refer to elements, actions, structures, steps, operations, values, and the like.

As used herein, the phrase "at least one," in reference to a list of one or more entities, should be understood to mean at least one entity selected from any one or more of the entities in the list of entities, but not necessarily including at least one of each and every entity specifically listed within the list of entities and not excluding any combinations of entities in the list of entities. This definition also allows that entities optionally may be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); and in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure. In this manner, the present disclosure is directed toward all novel and nonobvious features and aspects of the various disclosed examples, alone and in various combinations and sub-combinations with one another. The methods, apparatus, and systems are not limited to any specific aspect or feature or combination thereof, nor do the disclosed examples require that any one or more specific advantages be present or problems be solved.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Disclosed algorithms may be, for example, embodied as software or firmware instructions carried out by a digital computer. For instance, any of the disclosed spectral analyses can be performed by a computer or other computing hardware (e.g., an ASIC or FPGA). The computer can be a computer system comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed analyses can be stored on the one or more volatile, non-transitory computer-readable media as computer-executable instructions, which when executed by the one or more processors, cause the one or more processors to perform any of the disclosed analyses. The results of the computations can be stored (e.g., in a suitable data structure or lookup table) in the one or more tangible, non-transitory computer-readable storage media and/or can also be output to the user, for example, by displaying, on a display device, spectroscopic analysis results, with a graphical user interface.

Examples of the Disclosed Technology

Examples of the disclosed technology include apparatuses for performing various spectroscopic analyses on samples, such as to detect the presence of various elements and/or molecules within such samples. In particular, in some examples, the disclosed apparatuses are configured to perform a first spectroscopic analysis on the sample to perform an elemental analysis of the sample and to perform a second spectroscopic analysis on the sample to perform a molecular and/or mineralogical analysis of the sample.

Additionally, the present disclosure is directed to portable apparatuses that are easy to carry and use by a single human operator in remote settings. In this manner, the disclosed apparatuses can facilitate the detection and quantitative identification of elements and compounds within samples in situ; that is, at locations removed from a traditional laboratory setting. As a representative example, such apparatuses can enable the detection and identification of rare earth elements (REEs) in coal-related materials without the need to collect and transport such materials to a central laboratory.

Figure 2:
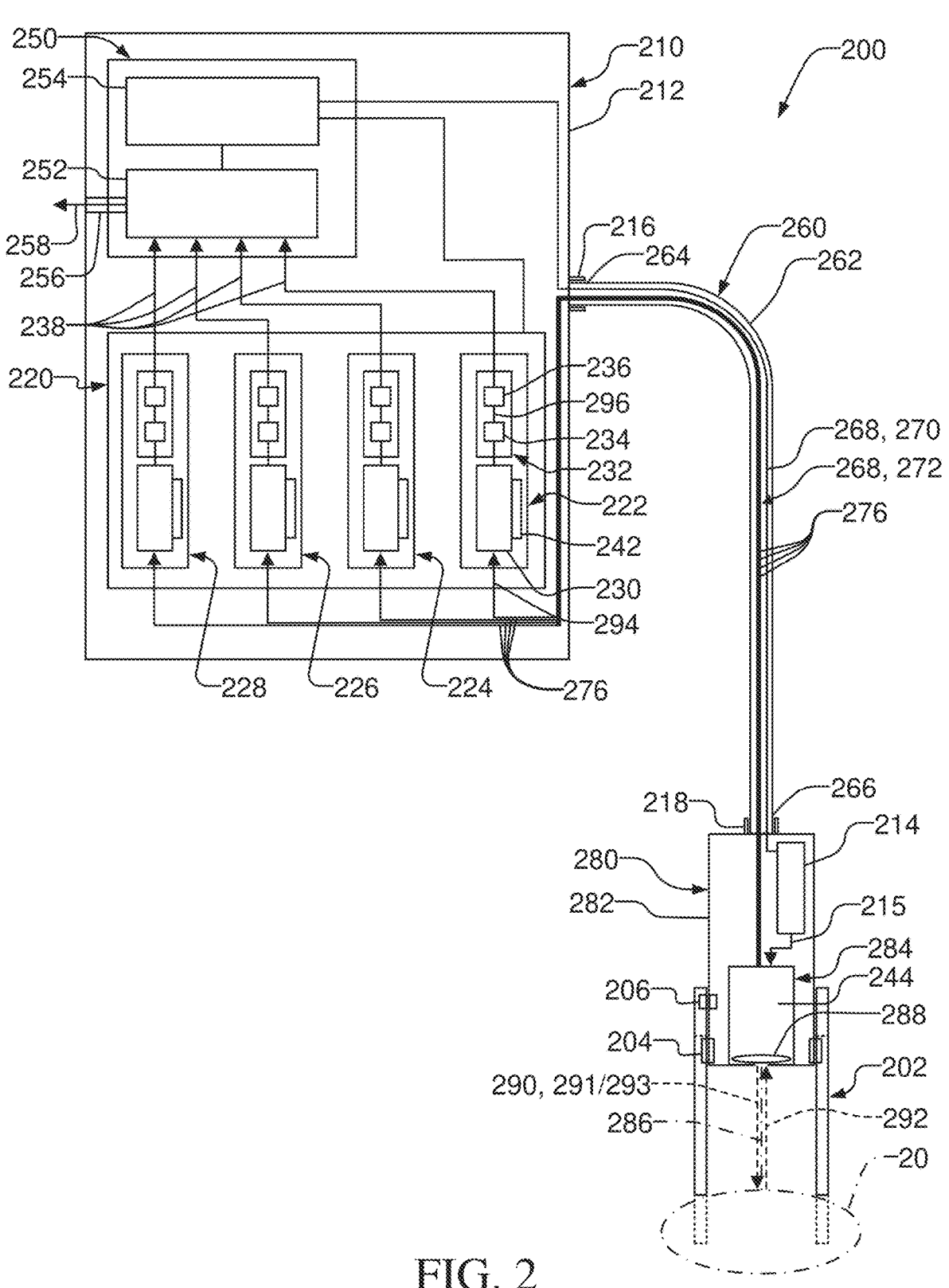
FIG. 2 is a schematic representation of a spectroscopic analysis assembly according to another example.
Figure 3:
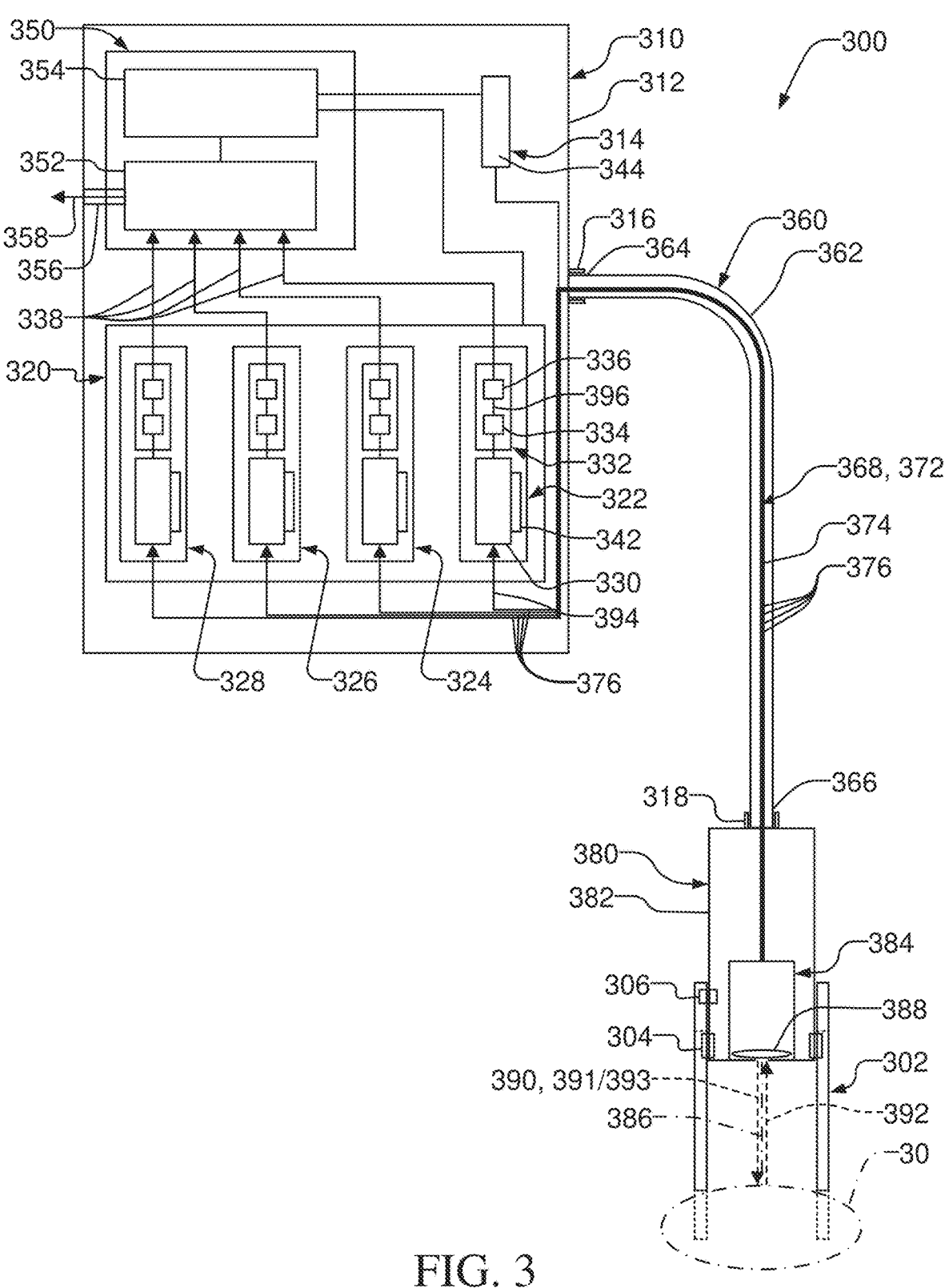
FIG. 3 is a schematic representation of a spectroscopic analysis assembly according to yet another example.

FIGS. 1-3 illustrate examples of portable spectroscopic analysis assemblies according to the present disclosure. In particular, FIG. 1 schematically illustrates the principal components of a portable spectroscopic analysis assembly 100, while FIG. 2 shows a portable spectroscopic analysis assembly 200 and FIG. 3 shows a portable spectroscopic analysis assembly 300. The portable spectroscopic analysis assembly 200 of FIG. 2 and the portable spectroscopic analysis assembly 300 of FIG. 3 each may be described as representing more specific examples of the portable spectroscopic analysis assembly 200 more generally illustrated in FIG. 2.

The portable spectroscopic analysis assembly 100, the portable spectroscopic analysis assembly 200, and/or the portable spectroscopic analysis assembly 300 can share any of a variety of components, features, configurations, etc. as disclosed herein, except as specified below. Accordingly, elements that serve a similar, or at least substantially similar, purpose, are labeled with like numbers in each of FIGS. 1-3, and these elements may not be discussed in detail herein with reference to each of FIGS. 1-3. In particular, such like numbers can include distinct first digits but common second and/or third digits. As an example, the laser source 114 of FIG. 1 discussed below can be at least substantially identical in structure, form, and/or functionality as the laser source 214 of FIG. 2 and/or the laser source 314 of FIG. 3. All elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure.

The present disclosure generally is presented with reference to the portable spectroscopic analysis assembly 200 of FIG. 2. In some cases, however, the present disclosure can refer to the portable spectroscopic analysis assembly 100 of FIG. 1 when discussing features that are generic to several different examples. In other cases, the present disclosure can refer to the portable spectroscopic analysis assembly 300 of FIG. 3 when discussing configurations and/or features that differ from those shown in FIG. 2. It is to be understood, however, that any reference to a component and/or feature discussed with reference to any one of FIGS. 1-3 also can be understood as describing analogous components shown in any other of FIGS. 1-3 as appropriate.

As shown in FIG. 1, the portable spectroscopic analysis assembly 100 includes an analysis subassembly 110, a probe subassembly 180, and a tether subassembly 160 interconnecting the analysis subassembly 110 and the probe subassembly 180. The portable spectroscopic analysis assembly 100 also includes a laser source 114 configured to generate an excitation laser signal 190, which may be specific to the spectroscopic analysis being performed.

As shown in FIG. 1, the probe subassembly 180 is configured to be positioned adjacent a sample 10 to be analyzed and to transmit the excitation laser signal 190 to the sample. The sample 10 can include and/or be any object suitable for spectroscopic analysis as described herein, such as a mineral and/or a coal-related material of unknown composition. The probe subassembly 180 is configured to receive an optical response signal 192 generated in response to the excitation laser signal 190 according to the spectroscopic analysis being performed, and the tether subassembly 160 is configured to convey the optical response signal 192 to the analysis subassembly 110 for analysis.

As discussed in more detail below, the analysis subassembly 110 can include a spectroscopy subassembly 120 configured to perform a spectroscopic analysis of the optical response signal 192 and/or a control subassembly 150 configured to programmed and/or configured to at least partially control operation of the portable spectroscopic analysis assembly 100. For example, the control subassembly 150 can be programmed and/or configured to at least partially control operation of the spectroscopy subassembly 120 and/or the laser source 114. Additionally, or alternatively, the control subassembly 150 can be programmed and/or configured to receive and/or process a spectroscopy signal 138 that is generated by the spectroscopy subassembly 220.

In some examples, the portable spectroscopic analysis assembly 100 can have various features and/or configurations to facilitate portable operation thereof. For example, the analysis subassembly 110 can be configured to be carried by a human operator during use, such as on the operator's back (e.g., as a backpack). Accordingly, in some examples, the analysis subassembly 110 can include shoulder straps and/or other support structures for supporting the analysis subassembly 110 in a worn configuration. In some examples, to facilitate carrying the analysis subassembly 110 during use, the analysis subassembly 110 can have a total mass that is less than approximately 20 kilograms (kg). This is not required, however, and it additionally is within the scope of the present disclosure that the analysis subassembly 110 can be characterized by any suitable total mass, such as a mass that enables transport of the portable spectroscopic analysis assembly 100 by a single person.

Additionally, or alternatively, the probe subassembly 180 can be configured to be handheld by the human operator during use, such as to enable the operator to manually position the probe subassembly 180 relative to the sample 10 (e.g., while carrying the analysis subassembly 110). Accordingly, in some examples, the probe subassembly 180 can include a handle and/or other features configured to be gripped and/or carried by the operator. In some examples, the probe subassembly 180 can have a total mass that is less than approximately 5 kg.

As shown in FIG. 2, the analysis subassembly 210 includes a spectroscopy subassembly 220 and an analysis subassembly housing 212 supporting the spectroscopy subassembly 220. In particular, in some examples, the spectroscopy subassembly 220 is at least substantially enclosed within the analysis subassembly housing 212. As discussed in more detail below, the spectroscopy subassembly 220 is configured to perform a spectroscopic analysis of the optical response signal 292.

As shown in FIG. 2, the probe subassembly 280 includes an optical probe 284 and a probe subassembly housing 282 supporting the optical probe 284. In particular, in some examples, the optical probe 284 is at least substantially enclosed within the probe subassembly housing 282. As discussed in more detail below, the optical probe 284 is configured to transmit the excitation laser signal 290 to the sample 20 and to receive the optical response signal 292 from the sample 20.

The portable spectroscopic analysis assembly 200 generally is configured to perform multiple distinct spectroscopic analyses of the sample 20. In particular, the present disclosure is directed to examples in which the portable spectroscopic analysis assembly 200 is configured to perform each of a laser-induced breakdown spectroscopy (LIBS) analysis and a Raman spectroscopy analysis of the sample 20. Accordingly, the portable spectroscopic analysis assembly 200 is configured to operate in each of a LIBS mode, in which the spectroscopy subassembly 220 is operative to perform a LIBS analysis of the optical response signal 292, and a Raman spectroscopy mode, in which the spectroscopy subassembly 220 is operative to perform a Raman spectroscopy analysis of the optical response signal 292.

A LIBS analysis can be used to characterize the identity and quantitative abundance of elements within a sample. In particular, when the portable spectroscopic analysis assembly 200 operates in the LIBS mode, laser light (e.g., the excitation laser signal 290) is directed to a target location on the sample 20 to ablate material from the sample and to form a plasma that emits the optical response signal 292 as it cools. The spectroscopy subassembly 220 then can analyze the atomic emission spectra represented in the optical response signal 292 to provide a quantitative analysis of the elemental composition of the sample 20.

A Raman spectroscopy analysis can be used to characterize the mineralogy of a sample, such as by identifying the molecules and/or minerals present within the sample. In particular, when the portable spectroscopic analysis assembly 200 operates in the Raman mode, laser light (e.g., the excitation laser signal 290) is directed to a target location on the sample 20. The laser light excites molecular vibrations within the sample 20, which in turn yield scattered laser light that is frequency-shifted relative to the excitation laser signal 290 in a manner according to the molecules present. The frequency-shifted scattered laser light can be received by the optical probe 284 as the optical response signal 292, and the spectroscopy subassembly 220 can analyze the spectral content of the optical response signal 292 to provide an indication of the mineralogy of the sample 20.

In some examples, one or more characteristics of the excitation laser signal 290 can be dependent upon the operational mode of the portable spectroscopic analysis assembly 200. For example, when the portable spectroscopic analysis assembly 200 operates in the LIBS mode, the excitation laser signal 290 can include and/or be a LIBS transmitted signal 291 with a spectral content characterized by a first characteristic wavelength. Alternatively, when the portable spectroscopic analysis assembly 200 operates in the Raman spectroscopy mode, the excitation laser signal 290 can include and/or be a Raman transmitted signal 293 with a spectral content characterized by a second characteristic wavelength that is different than the first characteristic wavelength.

As used herein, the term "characteristic wavelength" refers to a wavelength that characterizes a laser signal even when the laser signal is not perfectly monochromatic. For example, the spectral content of a laser signal (e.g., the LIBS transmitted signal 291 and/or the Raman transmitted signal 293) can exhibit a maximum amplitude at a characteristic wavelength thereof and a reduced but nonzero amplitude immediately surrounding the characteristic wavelength. Accordingly, in such examples, the characteristic wavelength (i.e., the wavelength corresponding to the amplitude peak of the spectral content of the signal) can be used to represent the predominant wavelength of the laser signal. Alternatively, in the limit that the laser signal approaches a perfectly monochromatic laser signal with a principal wavelength, the characteristic wavelength is simply the principal wavelength.

In some examples, the second characteristic wavelength is approximately half of the first characteristic wavelength. In particular, in some examples, the laser source 214 is configured to generate a base laser signal 215 with the first characteristic wavelength, and the Raman transmitted signal 293 is formed by frequency-doubling the base laser signal 215. In a representative example, the first characteristic wavelength is approximately 1064 nanometers (nm), and the second characteristic wavelength is approximately 532 nm. This is not required, however, and it additionally is within the scope of the present disclosure that the first characteristic wavelength and the second characteristic wavelength can have any of a variety of respective and/or relative values. For example, the first characteristic wavelength can assume any value suitable for operation in the LIBS mode, while the second characteristic wavelength can assume any value suitable for operation in the Raman spectroscopy mode.

In some examples, and as shown in FIG. 2, the portable spectroscopic analysis assembly 200 includes an optical switch 244 that is configured to selectively produce the excitation laser signal 290 with the first characteristic wavelength or with the second characteristic wavelength. Stated differently, the optical switch 244 can be configured to selectively produce the LIBS transmitted signal 291 or the Raman transmitted signal 293 from the base laser signal 215. For example, the optical switch 244 can be configured to receive the base laser signal 215 with the first characteristic wavelength and to either pass the base laser signal 215 as the LIBS transmitted signal 291 or to modulate the base laser signal 215 to produce the Raman transmitted signal 293.

When present, the optical switch 244 can be configured to selectively modulate the base laser signal 215 in any suitable manner. For example, the optical switch 244 can be configured to selectively frequency-double the base laser signal 215 to produce the Raman transmitted signal 293 in any suitable manner known to the art, such as with a nonlinear optical element (e.g., a birefringent crystal).

The optical switch 244 can be incorporated into any suitable component of the portable spectroscopic analysis assembly 200. For example, and as shown in FIG. 2, the optical switch 244 can be a component of the optical probe 284, and the laser source 214 can be configured to transmit the base laser signal 215 to the optical probe 284. As another example, and as shown in FIG. 3, the laser source 314 can include the optical switch 344. These examples are not limiting, however, and it further is within the scope of the present disclosure that the optical switch 244 can be positioned at any suitable location of the portable spectroscopic analysis assembly 200.

The laser source 214 can include and/or be any suitable laser source, such as a solid-state laser, a gas laser, a laser diode, a fiber laser, a fiber-coupled laser, a tunable laser, etc. In a representative example, the laser source 214 includes an Nd:YAG solid-state laser that emits laser light at a wavelength of approximately 1064 nm. In many examples, the laser source 214 includes a single output laser, e.g., a laser producing a beam at a first characteristic wavelength and switchably configured to operate at a second characteristic wavelength (e.g., via operation of the optical switch 244). In further examples, the laser source 214 can include multiple output lasers, such as multiple laser diodes producing output beams at a first characteristic wavelength, with the beams then combined and switchably configured to operate (before or after beam combination) at a second characteristic wavelength. In additional examples, the laser source 214 can include one or more lasers that produce respective base laser signal(s) 215 at a first characteristic wavelength and one or more separate lasers that produce respective base laser signal(s) 215 at a second characteristic wavelength. In various examples, the laser (or different lasers) of the laser source 214 can be configured to operate as a pulsed laser and/or as a continuous wave (CW) laser.

The laser source 214 can be supported by any suitable portion of the portable spectroscopic analysis assembly 200. For example, in the example of FIG. 2, the probe subassembly 280 includes the laser source 214, with the probe subassembly housing 282 supporting and/or at least substantially enclosing the laser source 214. In other examples, and as shown in FIG. 3, the analysis subassembly 310 can include the laser source 314, with the analysis subassembly housing 312 supporting and/or at least substantially enclosing the laser source 314. Positioning the laser source 314 within the analysis subassembly housing 312 as shown in FIG. 3 can desirably reduce a total weight and/or size of the probe subassembly 380 (e.g., relative to the configuration shown in FIG. 2).

In some examples, the portable spectroscopic analysis assembly 200 is configured such that each of the LIBS transmitted signal 291 and the Raman transmitted signal 293 is a pulsed laser signal. LIBS spectroscopy analyses typically use a pulsed excitation signal because the optical response signal 292 primarily is emitted from the cooling plasma after each laser pulse ceases.

Raman spectroscopy, by contrast, generally can be performed using either CW or pulsed laser excitation. Using pulsed laser excitation in Raman spectroscopy, however, can facilitate excluding signals from the optical response signal 292 other than the Raman spectra to be analyzed. For example, the laser excitation can produce fluorescence in the sample that can contaminate the optical response signal 292 with extraneous signals. Using pulsed laser excitation can enable the use of time-resolved luminescence (TRL) spectroscopy techniques, in which receipt and/or analysis of the optical response signal 292 is time-gated to isolate the portion of the optical response signal 292 corresponding to the scattered excitation laser signal 290 that is frequency-shifted in the manner of interest. Such time gating can be performed in any suitable manner, such as within the spectroscopy subassembly 220 as discussed below. In this manner, each of the LIBS transmitted signal 291 and the Raman transmitted signal 293 can be produced from a common pulsed base laser signal 215 of the laser source 214.

The probe subassembly 280 and/or the optical probe 284 can have any suitable components and/or features for transmitting the excitation laser signal 290 and/or for receiving the optical response signal 292. For example, and as shown in FIG. 2, the optical probe 284 can include one or more lens elements 288 configured to focus the excitation laser signal 290 onto the sample 20. In some such examples, the lens element(s) 288 also can be configured to receive the optical response signal 292 and/or to couple the optical response signal 292 to an optical fiber for conveying the optical response signal 292 to the analysis subassembly 210.

In some examples, and as shown in FIG. 2, the probe subassembly 280 includes a hood 202 coupled to the probe subassembly housing 282 and configured to shield the optical probe 284 from ambient light during use of the portable spectroscopic analysis assembly 200. For example, the optical probe 284 can be configured to transmit the excitation laser signal 290 along a probe axis 286 defined by the probe subassembly 280, and the hood 202 can extend along a direction parallel to the probe axis 286 and/or can at least partially surround the probe axis 286. In some examples, the hood 202 is at least substantially cylindrical and extends fully around the probe axis 286. Accordingly, the hood 202 can be brought into close proximity and/or contact with the sample 20 during use of the portable spectroscopic analysis assembly 200 such that the optical response signal 292 is substantially absent of any ambient light. The hood 202 can be formed of any suitable material that is at least substantially opaque to ultraviolet, visible, and/or near infrared light.

In some examples, the probe subassembly 280 can include one or more features to restrict operation of the portable spectroscopic analysis assembly 200 at least partially based upon a configuration of the hood 202 relative to the sample 20. For example, the hood 202 can be configured to directly engage the sample 20 and to retract relative to the probe subassembly housing 282 to enable operation of the portable spectroscopic analysis assembly 200. More specifically, and as shown in FIG. 2, the hood 202 can be configured to translate relative to the probe subassembly housing 282 along a direction at least substantially parallel to the probe axis 286 to transition between a disengaged configuration (dashed lines) and an engaged configuration (solid lines).

In such an example, the probe subassembly 280 can be operative to transmit the excitation laser signal 290 to the sample 20 only when the hood is in the engaged configuration. Stated differently, in such an example, it can be necessary to position the probe subassembly 280 with the hood 202 in contact with the sample 20 and to further drive the probe subassembly housing 282 toward the sample 20 to transition the hood 202 from the disengaged configuration to the engaged configuration to enable the probe subassembly 280 to transmit the excitation laser signal 290 to the sample 20. In particular, such a configuration can ensure that the excitation laser signal 290 is not inadvertently transmitted and/or directed toward an operator's eye.

In some such examples, and as shown in FIG. 2, the probe subassembly 280 includes a lockout mechanism 206 that is configured to enable transmission of the excitation laser signal 290 only when the hood 202 is in the engaged configuration. The lockout mechanism 206 can include and/or be any suitable mechanism, such as an electrical switch that completes a circuit only when the hood 202 is in a position corresponding to the engaged configuration. In other examples, the lockout mechanism 206 can include and/or be a mechanical switch, a non-contact sensor, a magnetic sensor, an electrical relay, etc.

The lockout mechanism 206 can function to prevent transmission of the excitation laser signal 290 in any suitable manner. As an example, the lockout mechanism 206 can selectively restrict and/or prevent the laser source 214 from generating and/or transmitting the base laser signal 215 and/or the excitation laser signal 290. As another example, the lockout mechanism 206 can selectively block and/or interrupt transmission of the excitation laser signal 290 to the optical probe 284 and/or from the optical probe 284 to the sample 20.

In some examples, the hood 202 is biased toward the disengaged configuration. For example, and as shown in FIG. 2, the probe subassembly 280 can include a hood biasing mechanism 204 (e.g., a spring mechanism) that biases the hood 202 toward the disengaged configuration.

Turning now to the operation of the analysis subassembly 210, the spectroscopy subassembly 220 can receive and analyze the optical response signal 292 in any suitable manner. In the example of FIG. 2, the spectroscopy subassembly 220 includes a plurality of spectrometer units 222-228, each configured to analyze a respective analyzed portion 294 of the optical response signal 292. In particular, each spectrometer unit can be characterized by a respective spectroscopic bandwidth of signal wavelengths upon which the spectrometer unit is configured to operate. Accordingly, each analyzed portion 294 of the optical response signal 292 can be characterized by a spectral content that at least partially overlaps the spectroscopic bandwidth of the corresponding spectrometer unit. Each spectrometer unit can be configured to generate a respective spectroscopy signal 238 that represents a spectral content of the optical response signal 292 within the respective spectroscopic bandwidth.

In particular, in the example of FIG. 2, the plurality of spectrometer units includes a first spectrometer unit 222, a second spectrometer unit 224, a third spectrometer unit 226, and a fourth spectrometer unit 228, each of which is configured to analyze a respective portion (e.g., of a total spectrum) of the optical response signal 292.

In the present disclosure, references to features and/or components of the first spectrometer unit 222 and/or of "each spectrometer unit 222" equivalently may be understood as referring to and/or describing each of the second spectrometer unit 224, the third spectrometer unit 226, and/or the fourth spectrometer unit 228, as applicable. For example, while FIG. 2 labels only the components of the first spectrometer unit 222, it is to be understood that like reference numbers and/or descriptions can be applied to the similarly illustrated components in each other spectrometer unit.

As shown in FIG. 2, each spectrometer unit 222 includes a spectrometer 230 and a sensor unit 232. In particular, each spectrometer 230 can be configured to separate the corresponding analyzed portion 294 of the optical response signal 292 into its respective spectral components, which in turn can be measured and/or recorded with the sensor unit 232. In some examples, each spectrometer 230 is a transmission spectrometer.

In a representative example, the first spectrometer unit 222 can be an ultraviolet (UV) spectrometer unit 222, and the spectroscopic bandwidth of the spectrometer 230 of the UV spectrometer unit 222 can be approximately 250 nm-340 nm.

Additionally, or alternatively, the second spectrometer unit 224 can be a violet light (VIO) spectrometer unit 224, and the spectroscopic bandwidth of the spectrometer 230 of the VIO spectrometer unit 224 can be approximately 380 nm-470 nm.

Additionally, or alternatively, the third spectrometer unit 226 can be a visible light (VIS) spectrometer unit 226, and the spectroscopic bandwidth of the spectrometer 230 of the VIS spectrometer unit 226 can be approximately 536 nm-650 nm.

Additionally, or alternatively, the fourth spectrometer unit 228 can be a very-near infrared (VNIR) spectrometer unit 228, and the spectroscopic bandwidth of the spectrometer 230 of the VNIR spectrometer unit 228 can be approximately 650 nm-850 nm.

As shown in FIG. 2, each sensor unit 232 can generate the respective spectroscopy signal 238 corresponding to the spectrometer unit 222. In particular, in this example, each sensor unit 232 includes an image sensor 236 that is configured to generate the respective spectroscopy signal 238. Each image sensor 236 can include and/or be any suitable device for generating the respective spectroscopy signal 238, such as a CCD sensor and/or a CMOS sensor.

In some examples, and as shown in FIG. 2, each sensor unit 232 includes an image intensifier 234 configured to amplify the analyzed portion 294 (e.g., as modified and/or output by the spectrometer 230) to produce an amplified optical signal 296. In such examples, the image sensor 236 can be configured to receive the amplified optical signal 296 and to generate the spectroscopy signal 238 based, at least in part, on the amplified optical signal 296.

In some examples, the image intensifier 234 can produce the amplified optical signal 296 such that the amplified optical signal 296 has a greater intensity than the analyzed portion 294 as output by the spectrometer 230. In some examples, this can enable the image sensor 236 to measure and/or record the amplified optical signal 296 with greater fidelity (e.g., with a higher signal-to-noise ratio).

Additionally, or alternatively, the image intensifier 234 can be configured to perform time gating upon the analyzed portion 294 such that the amplified optical signal 296 is a gated amplified signal 296. In particular, when the excitation laser signal 290 is a pulsed laser signal, the image intensifier 234 can be synchronized with the laser source 214 such that the gated amplified signal 296 is temporally correlated with the excitation laser signal 290. In this manner, the image intensifier 234 can be used to restrict the portion of the amplified optical signal 296 that reaches the image sensor 236 to be that which corresponds to the excitation laser signal 290 rather than to extraneous and/or ambient light.

In some examples, and as shown in FIG. 2, the spectroscopy subassembly 220 can include at least one spectrometer cooler 242 configured to regulate a temperature of one or more of the spectrometer units 222. For example, in the example of FIG. 2, each spectrometer unit 222 includes a respective spectrometer cooler 242 configured to cool the respective spectrometer 230, such as to maintain the spectrometer 230 within a preferred range of operational temperatures. Each spectrometer cooler 242 can include and/or be any suitable device for temperature regulation, such as a thermoelectric cooler.

The portable spectroscopic analysis assembly 200 can be configured to deliver the optical response signal 292 to the spectrometer units 222 in any suitable manner. For example, in the example of FIG. 2, the optical response signal 292 can be coupled to each of a plurality of received signal fibers 276, each of which conveys the full spectral content of the optical response signal 292 to a respective spectrometer unit 222. In such an example, the analyzed portion 294 conveyed to each spectrometer unit 222 can be the optical response signal 292 itself, which can include spectral content that falls within the respective spectroscopic bandwidth of each spectrometer unit 222.

As shown in FIG. 2, the portable spectroscopic analysis assembly 200 additionally includes a control subassembly 250 programmed and/or configured to at least partially control operation of the portable spectroscopic analysis assembly 200. In some examples, the control subassembly 250 is at least partially supported by and/or enclosed within the analysis subassembly housing 212.

In some examples, the control subassembly 250 includes a power supply 254 configured to provide electrical power to one or more components of the portable spectroscopic analysis assembly 200. For example, the power supply 254 can include and/or be one or more batteries. In some examples, the power supply 254 is at least partially supported by and/or enclosed within the analysis subassembly housing 212.

In some examples, the power supply 254 is configured to power the laser source 214. In particular, FIG. 2 illustrates an example in which the power supply 254 is positioned within the analysis subassembly housing 212 and the laser source 214 is positioned within the probe subassembly housing 282. Accordingly, in this example, the tether subassembly 260 includes a power cable 270 that conveys the electrical power from the power supply 254 to the laser source 214.

Additionally, or alternatively, the power supply 254 can be configured to provide electrical power to one or more components of each spectrometer unit 222, such as the spectrometer 230, the image intensifier 234, the image sensor 236, and/or the spectrometer cooler 242.

In some examples, and as shown in FIG. 2, the control subassembly 250 additionally or alternatively can include a controller 252 that is programmed to receive each spectroscopy signal 238 from the spectroscopy subassembly 220. The controller 252 further can be programmed to perform a spectroscopic analysis on the spectroscopy signal 238 and to generate an analysis signal 258 that is based, at least in part, on the spectroscopic analysis of the spectroscopy signal 238. As examples, the spectroscopic analysis can include and/or be a LIBS analysis and/or a Raman spectroscopy analysis.

The analysis signal 258 can include and/or be any suitable representation of the spectroscopic analysis performed by the controller 252. For example, the analysis signal 258 can include at least a portion of each spectroscopy signal 238. Additionally, or alternatively, the analysis signal 258 can represent a chemical composition of the sample 20, an elemental composition of the sample 20, a mineralogy of the sample 20, etc.

In some examples, the control subassembly 250 additionally can include a communications interface 256 configured to convey the analysis signal to an operator and/or to an external device, such as a computer, a tablet computer, a portable electronic device, etc. As examples, the communications interface 256 can include and/or be a data transfer port, a physical media writer, a wireless communications interface, etc.

The tether subassembly 260 can have any suitable structure and/or components for conveying the optical response signal 292 to the analysis subassembly 210 and/or for conveying other signals and/or power sources as applicable. For example, and as shown in FIG. 2, the tether subassembly 260 can include one or more connection lines 268 for conveying signals and/or power between the analysis subassembly 210 and the probe subassembly 280 and a tether subassembly housing 262 that supports the connection line(s) 268.

In some examples, the connection line(s) 268 include one or more optical fibers configured to convey optical signals between the analysis subassembly 210 and the probe subassembly 280. For example, the connection line(s) 268 can include one or more received signal fibers 276 configured to convey the optical response signal 292 from the probe subassembly 280 to the analysis subassembly 210.

In the example of FIG. 2, and as discussed above, the connection line(s) 268 include a plurality of received signal fibers 276, which collectively can be referred to as an optical fiber bundle 272. Similarly, in the example of FIG. 3, the connection line 368 includes a plurality of received signal fibers 376, which collectively can be referred to as an optical fiber bundle 372. Additionally, in the example of FIG. 3, the optical fiber bundle 372 further includes a transmitted signal fiber 374 that conveys the excitation laser signal 390 from the laser source 314 to the probe subassembly 380.

In some examples, the tether subassembly 260 is flexible, such as to facilitate positioning the probe subassembly 280 relative to the sample 20. In particular, in some examples, the tether subassembly housing 262 includes and/or is a flexible sheath that at least substantially encloses the connection line(s) 268.

In some examples, the tether subassembly 260 can be configured to be selectively disconnected from one or both of the analysis subassembly 210 and the probe subassembly 280. For example, and as shown in FIG. 2, the analysis subassembly 210 can include an analysis subassembly tether port 216, and the tether subassembly 260 can include an analysis subassembly connection end 264 that is configured to be selectively coupled to the analysis subassembly tether port 216. Similarly, the probe subassembly 280 can include a probe subassembly tether port 218, and the tether subassembly 260 can include a probe subassembly connection end 266 that is configured to be selectively coupled to the probe subassembly tether port 218. In this manner, in such examples, the tether subassembly 260 can be selectively removed from and reattached to the analysis subassembly 210 and/or the probe subassembly 280, such as to facilitate transportation of the portable spectroscopic analysis assembly 200.

Having described and illustrated the principles of the disclosed technology with reference to the illustrated embodiments, it will be recognized that the illustrated embodiments can be modified in arrangement and detail without departing from such principles. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus comprising:

an analysis subassembly comprising a spectroscopy subassembly;

a probe subassembly comprising an optical probe, a probe subassembly housing supporting the optical probe, and a hood coupled to the probe subassembly housing;

a tether subassembly interconnecting the analysis subassembly and the probe subassembly; and a laser source configured to generate an excitation laser signal, wherein the optical probe is configured to transmit the excitation laser signal along a probe axis, wherein the hood extends along a direction parallel to the probe axis and is configured to shield the optical probe from ambient light, wherein the hood is configured to translate relative to the probe subassembly housing along a direction at least substantially parallel to the probe axis to transition between a disengaged configuration and an engaged configuration, wherein the probe subassembly is configured to transmit the excitation laser signal to a sample and to receive an optical response signal from the sample, wherein the probe subassembly is operative to transmit the excitation laser signal when the hood is in the engaged configuration and is prevented from transmitting the excitation laser signal when the hood is in the disengaged configuration, and wherein the analysis subassembly is operative to perform each of a laser-induced breakdown spectroscopy (LIBS) analysis and a Raman spectroscopy analysis of the optical response signal to at least partially characterize a composition of the sample.

2. The apparatus of claim 1, wherein the laser source is configured to generate the excitation laser signal as a pulsed laser signal for one or both of the LIBS analysis and the Raman spectroscopy analysis.

3. An apparatus comprising:

an analysis subassembly comprising a spectroscopy subassembly and an analysis subassembly housing supporting the spectroscopy subassembly;

a probe subassembly comprising an optical probe, a probe subassembly housing supporting the optical probe, and a hood coupled to the probe subassembly housing and configured to shield the optical probe from ambient light;

a tether subassembly interconnecting the analysis subassembly and the probe subassembly; and a laser source configured to generate an excitation laser signal, wherein the probe subassembly is configured to transmit the excitation laser signal to a sample and to receive an optical response signal from the sample, wherein the tether subassembly is configured to convey the optical response signal to the spectroscopy subassembly, wherein the apparatus is configured to operate in each of:

a LIBS mode, in which the spectroscopy subassembly is operative to perform a LIBS analysis of the optical response signal; and a Raman spectroscopy mode, in which the spectroscopy subassembly is operative to perform a Raman spectroscopy analysis of the optical response signal, wherein the hood is configured to translate relative to the probe subassembly housing to transition between a disengaged configuration and an engaged configuration, and wherein the hood is biased toward the disengaged configuration.

4. The apparatus of claim 3, wherein, when the apparatus operates in the Raman spectroscopy mode, the excitation laser signal is a pulsed laser signal.

5. The apparatus of claim 3, wherein the analysis subassembly is configured to be carried by a human operator, wherein the probe subassembly is configured to be handheld by the human operator, and wherein the analysis subassembly has a total mass that is less than approximately 20 kilograms (kg).

6. The apparatus of claim 3, wherein the tether subassembly is configured to be selectively removed from and reattached to one or both of the analysis subassembly and the probe subassembly.

7. The apparatus of claim 3, further comprising an optical switch configured to selectively produce the excitation laser signal with a first characteristic wavelength or with a second characteristic wavelength that is different than the first characteristic wavelength, wherein, when the apparatus operates in the LIBS mode, the optical switch produces the excitation laser signal with the first characteristic wavelength, and wherein, when the apparatus operates in the Raman spectroscopy mode, the optical switch produces the excitation laser signal with the second characteristic wavelength.

8. The apparatus of claim 3, wherein the laser source comprises an Nd:YAG laser.

9. The apparatus of claim 3, wherein the optical probe is configured to transmit the excitation laser signal along a probe axis, wherein the hood extends along a direction parallel to the probe axis.

10. The apparatus of claim 9, wherein the hood is configured to translate relative to the probe subassembly housing along a direction at least substantially parallel to the probe axis to transition between the disengaged configuration and the engaged configuration, and wherein the probe subassembly is operative to transmit the excitation laser signal only when the hood is in the engaged configuration.

11. The apparatus of claim 10, wherein the probe subassembly comprises a lockout mechanism configured to enable transmission of the excitation laser signal only when the hood is in the engaged configuration.

12. The apparatus of claim 3, wherein the spectroscopy subassembly comprises a plurality of spectrometer units, wherein each spectrometer unit comprises a spectrometer and a sensor unit, and wherein each spectrometer unit is configured to:

(i) analyze a respective analyzed portion of the optical response signal that comprises wavelengths within a respective spectroscopic bandwidth of the spectrometer unit; and (ii) generate a respective spectroscopy signal that represents a spectral content of the optical response signal within the respective spectroscopic bandwidth.

13. The apparatus of claim 12, wherein, for each spectrometer unit of the plurality of spectrometer units, the spectrometer is a transmission spectrometer.

14. The apparatus of claim 12, wherein, for each spectrometer unit of the plurality of spectrometer units, the sensor unit comprises:

an image intensifier configured to amplify the analyzed portion of the optical response signal to produce an amplified optical signal; and an image sensor configured to receive the amplified optical signal and to generate the spectroscopy signal.

15. The apparatus of claim 14, wherein the excitation laser signal is a pulsed laser signal, and wherein the image intensifier is synchronized with the laser source such that the amplified optical signal is a gated amplified signal that is temporally correlated with the excitation laser signal.

16. The apparatus of claim 3, further comprising a control subassembly at least partially enclosed within the analysis subassembly housing and configured to at least partially control operation of one or both of the spectroscopy subassembly and the laser source.

17. The apparatus of claim 16, wherein the control subassembly comprises a controller programmed to receive a spectroscopy signal from the spectroscopy subassembly and to perform one or both of the LIBS analysis and the Raman spectroscopy analysis on the spectroscopy signal to generate an analysis signal that represents one or both of a chemical composition of the sample and a mineralogy of the sample.

18. The apparatus of claim 16, wherein the control subassembly comprises a communications interface configured to convey an analysis signal to an external device, wherein the analysis signal represents one or both of a chemical composition of the sample and a mineralogy of the sample.

19. The apparatus of claim 3, wherein the tether subassembly comprises one or more connection lines and a tether subassembly housing supporting the one or more connection lines.

20. The apparatus of claim 19, wherein the one or more connection lines comprises one or more optical fibers configured to convey optical signals between the analysis subassembly and the probe subassembly.

21. An apparatus comprising:

an analysis subassembly comprising a spectroscopy subassembly and an analysis subassembly housing supporting the spectroscopy subassembly;

a probe subassembly comprising an optical probe and a probe subassembly housing supporting the optical probe;

a tether subassembly interconnecting the analysis subassembly and the probe subassembly; and a laser source configured to generate an excitation laser signal, wherein the probe subassembly is configured to transmit the excitation laser signal to a sample and to receive an optical response signal from the sample, wherein the tether subassembly is configured to convey the optical response signal to the spectroscopy subassembly, wherein the apparatus is configured to operate in each of:

a LIBS mode, in which the spectroscopy subassembly is operative to perform a LIBS analysis of the optical response signal; and a Raman spectroscopy mode, in which the spectroscopy subassembly is operative to perform a Raman spectroscopy analysis of the optical response signal, wherein the spectroscopy subassembly comprises a plurality of spectrometer units, wherein each spectrometer unit comprises a spectrometer and a sensor unit, and wherein each spectrometer unit is configured to:

(i) analyze a respective analyzed portion of the optical response signal that comprises wavelengths within a respective spectroscopic bandwidth of the spectrometer unit; and (ii) generate a respective spectroscopy signal that represents a spectral content of the optical response signal within the respective spectroscopic bandwidth, and wherein, for each spectrometer unit of the plurality of spectrometer units, the sensor unit comprises:

an image intensifier configured to amplify the analyzed portion of the optical response signal to produce an amplified optical signal; and an image sensor configured to receive the amplified optical signal and to generate the spectroscopy signal.

\* \* \* \* \*